No. 697,733. Patented Apr. 15, 1902.
A. D. LUNT.
MULTIPLE CONDUCTOR SYSTEM.
(Application filed Sept. 27, 1901.)
(No Model.)
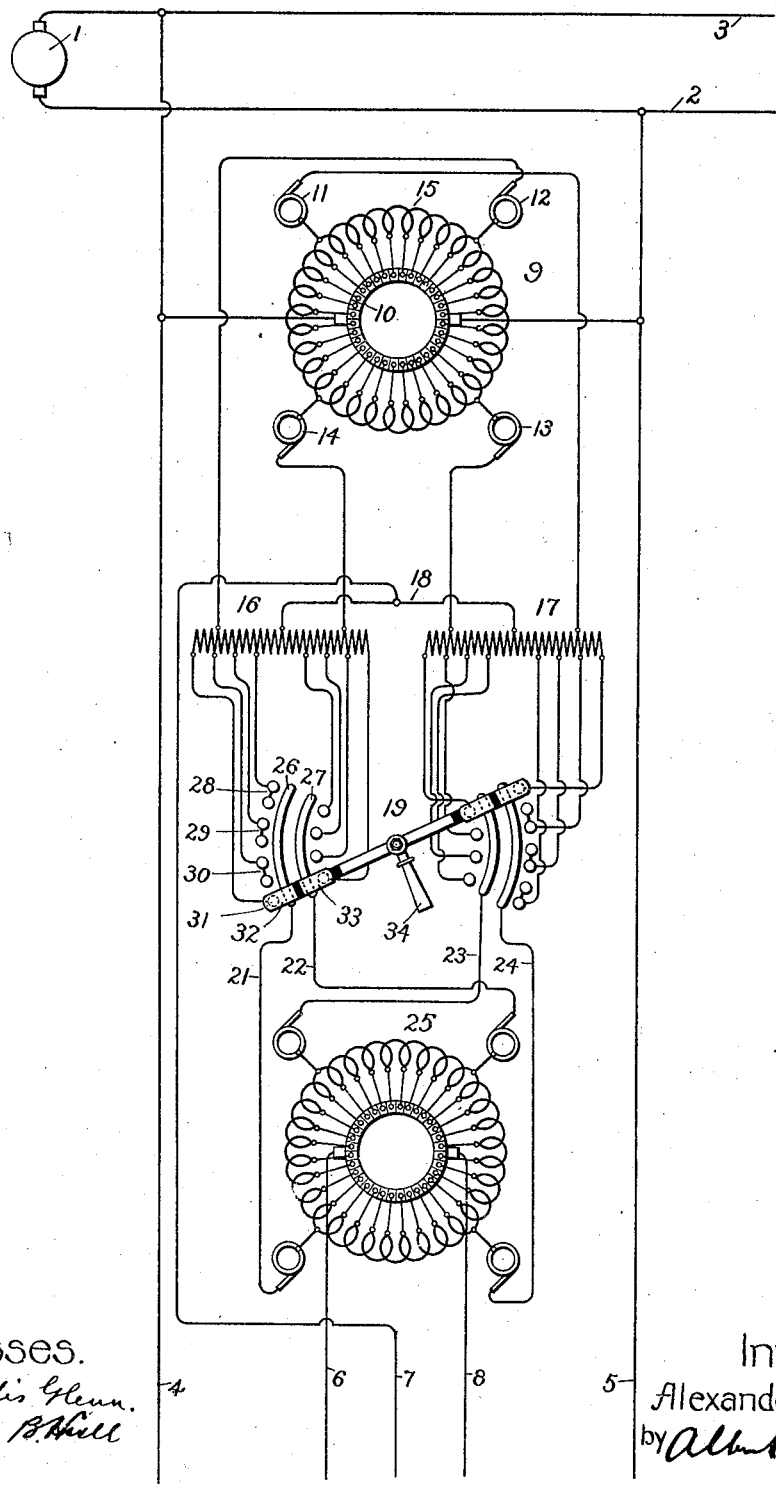
Witnesses.
John Ellis Glenn.
Benjamin B. Hill.
Inventor.
Alexander D. Lunt.
by Albert B. Davis
Atty.

ature-winding 15. The neutral conductor 7, extending from the connection 18, is therefore of neutral potential with respect to the mains 4 5, connected to the commutator 10 of the machine 9, and is similar in function to the neutral conductor of an ordinary three-wire system.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

MULTIPLE-CONDUCTOR SYSTEM.

SPECIFICATION forming part of Letters Patent No. 697,733, dated April 15, 1902.

Application filed September 27, 1901. Serial No. 76,786. (No model.)

*To all whom it may concern:*

Be it known that I, ALEXANDER D. LUNT, a citizen of the United States, residing at Schenectady, county of Schenectady, State of New York, have invented certain new and useful Improvements in Multiple-Conductor Systems, (Case No. 1,888,) of which the following is a specification.

My present invention relates to multiple-conductor systems of electrical distribution, and comprises means whereby the conductors of such a system may be maintained at different potentials and whereby the difference of potential between conductors of such a system may be varied or regulated at will.

The features of novelty which characterize the invention are pointed out in the appended claims.

The invention itself may be embodied in a variety of different forms, one of which is described below in connection with the accompanying drawing.

In the drawing, 1 represents a main source of direct current from which extend mains 2 3. These mains supply current to the outside conductors 4 5 of a multiple-conductor distribution system. The other conductors of this system are represented at 6, 7, and 8 and are maintained at different potentials in a manner about to be described.

Across the conductors 4 5 is connected a machine 9, similar to a rotary converter. This machine is inverted in function as compared with a rotary converter, receiving direct current through a commutator 10 and supplying alternating current from its collector-rings 11 12 13 14, connected in this case in quarter-phase relation to the armature-winding 15. The field-winding of the machine is not represented, but may be connected, as usual, in shunt to the direct-current leads of the machine. The alternating-current leads extending from the machine 9 are connected to two compensators 16 and 17, the compensator 16 being connected between the collector-rings 12 and 14 and the compensator 17 between the remaining collector-rings 11 and 13. The middle points of the compensators are connected together by a conductor 18, which is thereby maintained at a neutral potential with respect to the arma- From the compensators 16 and 17 extend a plurality of taps, and a switching device 19 is arranged to coöperate with these taps in such a way as to connect predetermined portions of the length of each compensator to a set of alternating-current leads 21, 22, 23, and 24, extending to corresponding collector-rings of a rotary converter 25. That portion of the switching device 19 which operates to vary the connections of the compensator 16 with the alternating-current leads 21 and 22 includes two continuous segmental contacts 26 27. A series of taps connected to points on one side of the middle of the compensator are joined, respectively, to fixed contacts 28, 29, 30, and 31. In a similar manner a series of fixed contacts are connected to the other side of the compensator-winding. Bridging-contacts 32 and 33, carried by the switch-arm of the switching device 19, are adapted to make connection between the segmental contacts 26 and 27 and their corresponding fixed contacts, thereby connecting the alternating leads 21 22 across different lengths of the compensator 16, symmetrically located with respect to the points of connection of the incoming leads for the compensator extending from the rings 12 and 14 of the machine 9. In a similar manner the switching device 19 is adapted to connect different portions of the length of the compensator 17 to the remaining alternating leads 23 24 of the rotary converter 25.

By shifting the position of the switching device 19 by a handle 34 or other device it will be seen that quarter-phase electromotive forces either greater or less in value than those produced by the machine 9 may be impressed upon the rotary converter 25, thereby giving rise to proportional electromotive forces between the direct-current conductors 6 8 of the said rotary converter. The potentials of the conductors 6 8 may therefore be varied so as to approach that of the neutral conductor 7, or the variation may be such as to cause the potentials of these conductors to approach or even exceed the potential difference of the mains 4 5. By adjusting the switching device 19 a large number of combinations of different electromotive forces may therefore be obtained between the various conductors 4 5 6 7 8 constituting the multiple-conductor system.

What I claim as new, and desire to secure by Letters Patent of the United States, is—

1. The combination of a source of direct current, an inverted rotary converter fed thereby, a second rotary converter connected so as to receive alternating current from the inverted rotary converter, and a multiple-conductor direct-current system including conductors extending from the direct-current ends of both of said converters.

2. The combination of a source of direct current, an inverted rotary converter fed thereby, means for altering the electromotive force of alternating current derived from said inverted rotary converter, a rotary converter fed by such alternating current, and a plurality of coöperating conductors extending from the direct-current ends of both converters.

3. The combination of two rotary converters, connections between the alternating-current leads of both rotary converters, and means for changing the electromotive force of the alternating current supplied by one rotary converter to the other.

4. The combination of a plurality of rotary converters, connections between the alternating-current terminals of both rotary converters, means for deriving a point having a potential neutral with respect to the windings of both converters, a neutral conductor extending from said neutral point, and other conductors extending from the direct-current terminals of said rotary converters and constituting with said neutral conductor a common distribution system.

5. The combination of a source of direct current, means for deriving therefrom a variable alternating electromotive force, means for converting said variable alternating electromotive force into a variable direct electromotive force, and means for impressing said variable direct electromotive force upon a consumption-circuit.

6. The combination of a main source of direct current, mains extending therefrom, and means for subdividing the difference of potential between said mains, said means consisting of two rotary converters, one of which is driven by the other through the medium of alternating currents of regulable electromotive force, the direct-current terminals of one of said rotary converters being connected to said mains and the direct-current terminals of the other rotary converter to a separate set of mains.

In witness whereof I have hereunto set my hand this 25th day of September, 1901.

ALEXANDER D. LUNT.

Witnesses:
BENJAMIN B. HULL,
HELEN ORFORD.